(12) United States Patent
Jaglowski et al.

(10) Patent No.: US 12,223,364 B2
(45) Date of Patent: Feb. 11, 2025

(54) REMOTELY CONTROLLABLE MONITORING AGENT WITH A DYNAMIC SET OF SUBCOMPONENTS

(71) Applicant: observIQ, Inc., Grand Rapid, MI (US)

(72) Inventors: Daniel R. Jaglowski, Grand Rapids, MI (US); Michael E. Kelly, Grand Rapids, MI (US)

(73) Assignee: observIQ, Inc., Grand Rapids, MI (US)

( * ) Notice: Subject to any disclaimer, the term of this patent is extended or adjusted under 35 U.S.C. 154(b) by 701 days.

(21) Appl. No.: 17/195,884

(22) Filed: Mar. 9, 2021

(65) Prior Publication Data
US 2022/0129324 A1  Apr. 28, 2022

Related U.S. Application Data

(63) Continuation-in-part of application No. 16/994,634, filed on Aug. 16, 2020, now abandoned.

(51) Int. Cl.
| | |
|---|---|
| *G06F 9/50* | (2006.01) |
| *G06F 8/61* | (2018.01) |
| *G06F 9/455* | (2018.01) |

(52) U.S. Cl.
CPC .............. *G06F 9/5055* (2013.01); *G06F 8/61* (2013.01); *G06F 9/45508* (2013.01); *G06F 11/3604* (2013.01); *G06F 2201/865* (2013.01); *G06F 2209/508* (2013.01)

(58) Field of Classification Search
CPC ...... G06F 9/5055; G06F 8/61; G06F 9/45508; G06F 11/3604; G06F 2201/865; G06F 2209/508
See application file for complete search history.

(56) References Cited

U.S. PATENT DOCUMENTS

| | | | |
|---|---|---|---|
| 6,192,518 B1 * | 2/2001 | Neal | G06F 8/658 717/176 |
| 6,701,521 B1 * | 3/2004 | McLlroy | G06F 8/61 717/173 |
| 8,001,542 B2 * | 8/2011 | Edwards | G06F 8/61 717/176 |
| 8,015,450 B1 * | 9/2011 | Cooley | G06F 9/44521 717/173 |
| 8,527,618 B1 * | 9/2013 | Wiese | G06F 21/575 717/172 |
| 10,409,507 B1 * | 9/2019 | Huang | G06F 13/4282 |
| 11,586,708 B2 * | 2/2023 | Mezzalira | G06F 21/12 |
| 2002/0083212 A1 * | 6/2002 | Salmon | G06F 9/44521 719/313 |
| 2006/0075408 A1 * | 4/2006 | Powers | G06F 9/5072 718/100 |
| 2007/0198975 A1 * | 8/2007 | Alnas | G06F 8/61 717/168 |
| 2009/0133014 A1 * | 5/2009 | Laurila | G06F 8/60 717/174 |

(Continued)

*Primary Examiner* — Benjamin C Wu
(74) *Attorney, Agent, or Firm* — Robinson + Cole

(57) ABSTRACT

An executable monitoring agent executing commands on a host server monitors for commands it cannot execute. Upon receiving a command that it cannot execute the monitoring agent initiates a search for the capability to execute the command. Upon finding the capability on the host server it is downloaded and installed, giving the monitoring agent the requisite capability to execute the command.

16 Claims, 5 Drawing Sheets

(56) References Cited

U.S. PATENT DOCUMENTS

| | | | | |
|---|---|---|---|---|
| 2012/0303477 | A1* | 11/2012 | Ben-Itzhak | G06Q 30/02 |
| | | | | 705/26.7 |
| 2014/0187177 | A1* | 7/2014 | Sridhara | G06N 5/01 |
| | | | | 455/73 |
| 2016/0154557 | A1* | 6/2016 | Zhang | G06F 21/31 |
| | | | | 715/744 |
| 2017/0357492 | A1* | 12/2017 | Adler | G06F 8/62 |
| 2018/0060052 | A1* | 3/2018 | Doar | G06N 20/00 |
| 2018/0129515 | A1* | 5/2018 | Kumar | G06F 8/65 |
| 2020/0034518 | A1* | 1/2020 | Mezzalira | G06F 8/64 |
| 2020/0348946 | A1* | 11/2020 | Pant | G06F 11/1417 |
| 2021/0034347 | A1* | 2/2021 | Robbins | G06F 8/658 |
| 2021/0264252 | A1* | 8/2021 | Davis | G06N 3/08 |
| 2021/0382710 | A1* | 12/2021 | Joubert | G06F 8/70 |
| 2022/0129324 | A1* | 4/2022 | Jaglowski | G06F 9/45508 |

* cited by examiner

REMOTELY CONTROLLABLE MONITORING AGENT WITH A DYNAMIC SET OF SUBCOMPONENTS

CROSS-REFERENCE TO RELATED APPLICATIONS

This application claims the benefit of and priority to U.S. patent application Ser. No. 16/994,634 filed Aug. 16, 2020 which is incorporated herein by reference in its entirety.

BACKGROUND

Technical Field

Various embodiments of the present invention relate to software code, and more specifically, to software code with a dynamic set of subcomponents.

Description of Related Art

A service is an application function or software system running on a computer or server. A service may be a component in a software process such as an application programming interface (API). A service is characterized by one or more predefined behaviors which may be known as capabilities (and may sometimes be called functionalities). As such services are used to perform a great number of computer-related tasks. There are times when an agent or other component running on a computer receives a command to perform a task but does not have that the capability to perform the task.

BRIEF SUMMARY

Various embodiments disclosed herein provide methods, systems and computer products for gaining a capability in a monitoring agent operating in a host. A command is received at the monitoring agent instructing the monitoring agent to perform a task. It is determined whether the monitoring agent has the capability to perform the command. If unable to perform the command a search is conducted for the capability to perform the command. Typically, the search is performed within the host computer on which the monitoring agent resides. The capability is obtained for the monitoring agent—that is, the capability is downloaded and installed. The monitoring agent executes the command to perform the task.

BRIEF DESCRIPTION OF THE DRAWINGS

The accompanying drawings, which are incorporated in and constitute part of the specification, illustrate various embodiments of the invention. Together with the general description, the drawings aid in explaining the principles of the invention. In the drawings.

DETAILED DESCRIPTION

Figure 1:
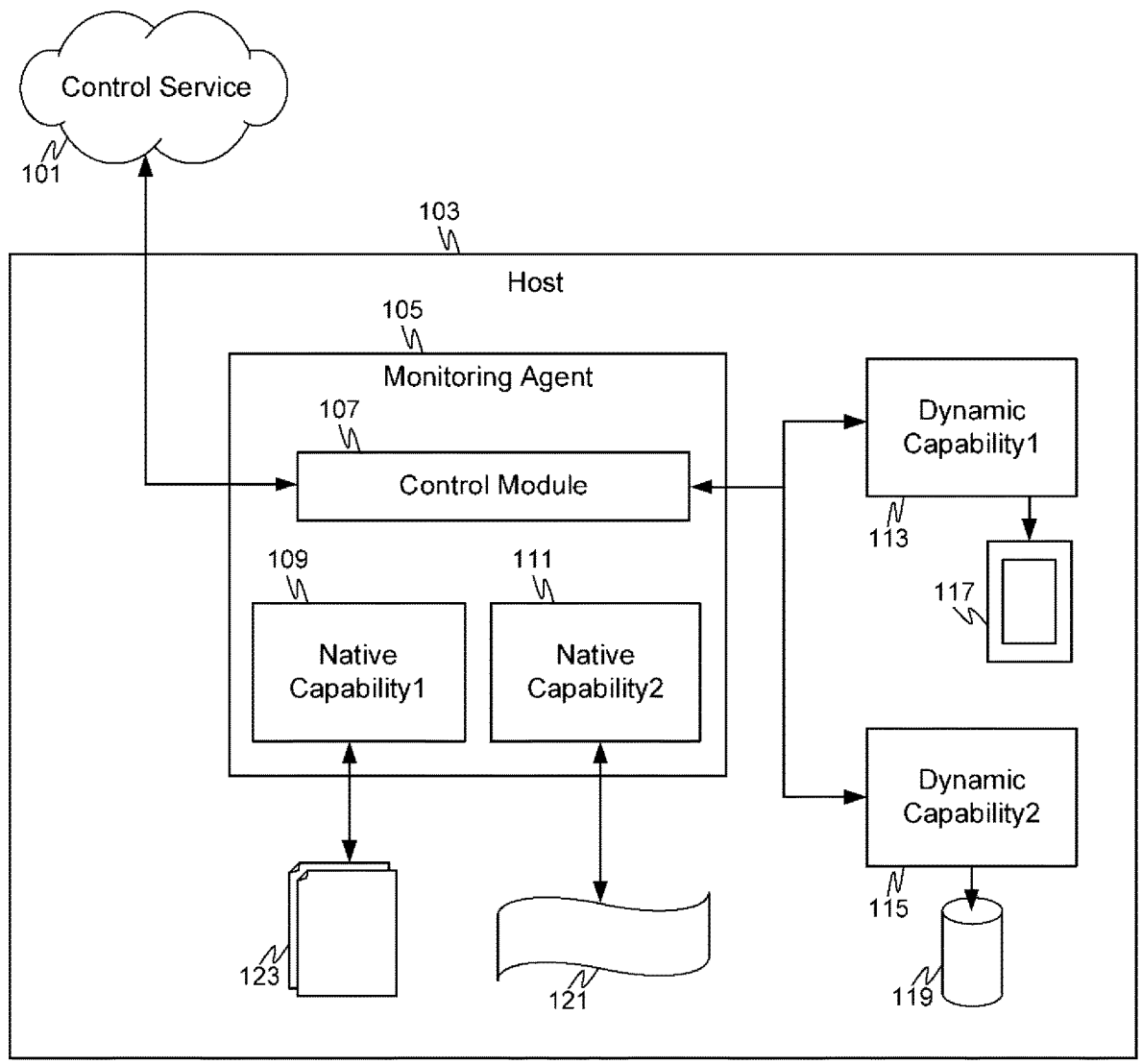
FIG. 1 depicts a block diagram of an infrastructure suitable for implementing various embodiments disclosed herein.

FIG. 1 depicts a block diagram of an infrastructure for implementing various embodiments disclosed herein. Various embodiments disclosed herein involve the identification retrieval of software capabilities on the basis of need.

A "host" is an environment in which one or more software programs can operate. For example, host 103 depicted in FIG. 1 may be a computer or server running an operating system. The host 103 may have a number of applications and programs running on itself such as monitoring agent 105. The applications and programs running on host 103 may also interface with applications and programs across a network running on other computers or servers, e.g., control service 101. A remote software agent is a program of instructions that runs on a device while being controlled by a remote application or service. A "monitoring agent" is a type of remove software agent. For example, monitoring agent 105 is a program running on host 103 under the control of control service 101. The control module 107 is logic or code within the monitoring agent 105 that interfaces with control service 101 allowing communications, commands and data to flow between control service 101 and monitoring agent 105. A "program of instructions" as this phrase is used herein is computer instructions, commands, software, code or other topic of logic that controls a computer, as is known by those of ordinary skill in the art.

Typically, an agent such as monitoring agent 105 is capable of performing a predefined set of behaviors, that is, capabilities. A "native capability" of an agent is a module, code, software, subroutines or other logic within the agent that performs the predefined task associated with that native capability without the need to work with or interface with another agent, web service or other logic outside of the agent. For example, monitoring agent 105 has native capability1 123 and native capability2 125. In this example, native capability1 123 allows the monitoring agent 105 to access and manipulate files 123—for example, read, write, modify and/or save files 123. Native capability2 125 is the ability to perform a query, that is, to retrieve status data or other information from another system or web service. The monitoring agent 105 can perform these two capabilities—native capability1 and native capability2—using code or other logic within the monitoring agent 105 itself.

A given agent may also gain a dynamic capability by accessing a subcomponent outside itself. Turning to FIG. 1, monitoring agent 105 can access subcomponent 113 labeled dynamic capability1 and subcomponent 115 labeled dynamic capability2. In this example, dynamic capability1 of subcomponent 113 involves accessing an encryption module 117 to encrypt data for storage or transmission or decipher encrypted data that has been received or retrieved from storage. Dynamic capability2 of subcomponent 115 involves accessing a remote server 119. Monitoring agent 105 cannot by itself perform the capabilities associated with subcomponents 113 and 115. Instead, monitoring agent 105 can accomplish these capabilities by discovering and accessing subcomponent 113 and subcomponent 115.

In various embodiments novel monitoring agent 105 is designed with dynamic capabilities in mind. That is, monitoring agent 105 is capable of seeking out, downloading and installing subcomponents as needed to perform tasks beyond its existing native capabilities. These subcomponents may take the form of other agents, executables, libraries, modules, web services or other logic. Monitoring agent 105 provides a control interface between these subcomponents and the remote application by interpreting and routing commands sent from the remote application, and reporting on the status of the subcomponents.

Figure 2A:
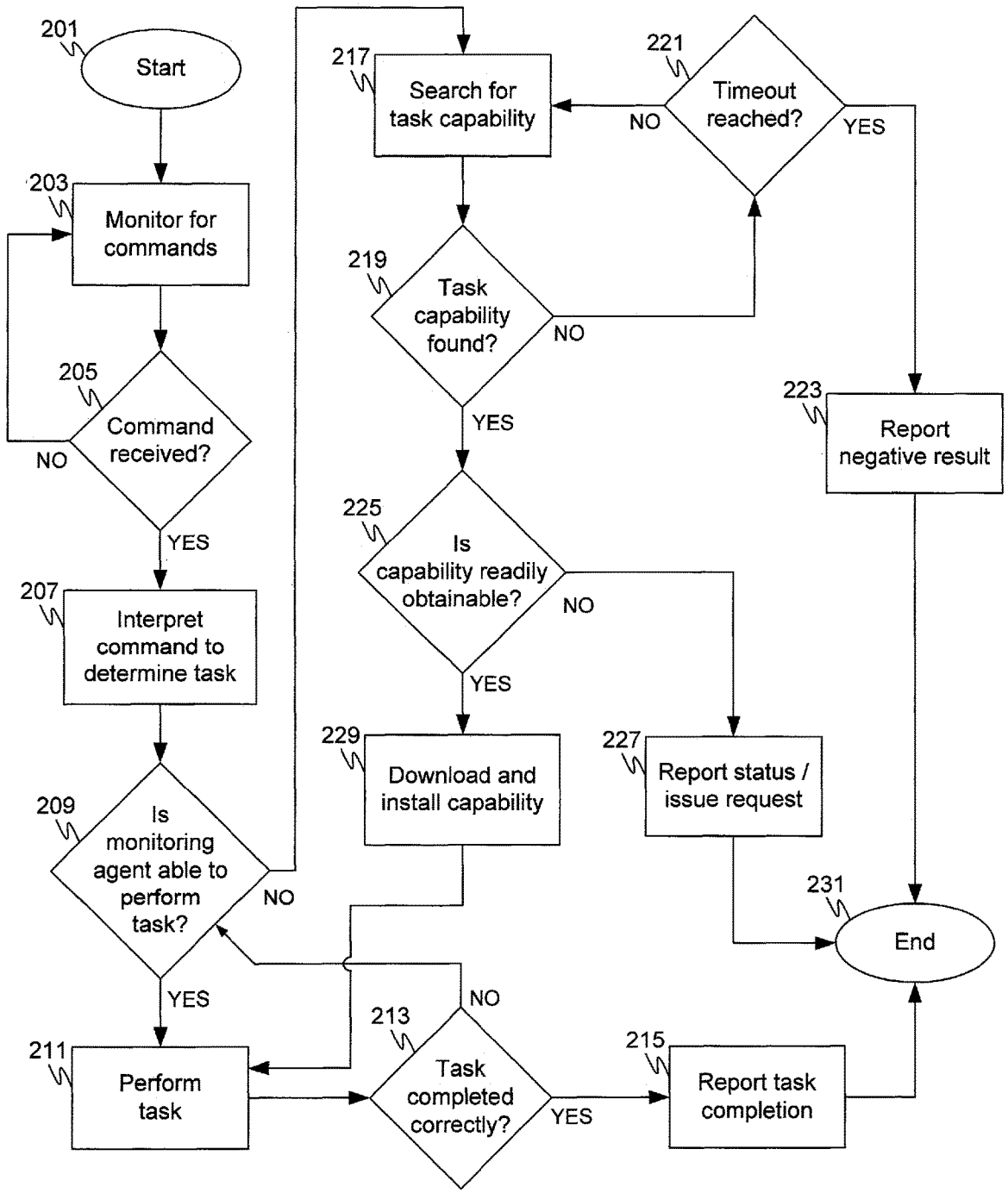
FIG. 2A is a flowchart of activities involved in retrieving a task capability in accordance with various embodiments.

FIG. 2A is a flowchart of activities involved in retrieving a task capability in accordance with various embodiments. The method begins in block 201 and proceeds to block 203 where a monitoring agent (e.g., monitoring agent 105 of FIG. 1), or other similar logic, monitors for a command received. The monitoring agent is typically operating (or running) on a host computer or server or other environment suitable for software programs or other logic to operate. A "command" as this term is used herein is a communication or received logic that includes some sort of request or order to perform a task. The task specified in the command could be any sort of activity that computers are known to handle or any computer-controlled activity. The method proceeds to block 205 where it is determined whether a command has been received. If it is determined in block 205 that no command has yet been received the method loops back along the "NO" path to continue monitoring for commands in block 203. If it is determined in block 205 that a command has been received, then the method proceeds along the "YES" path to block 207.

In block 207 the command is interpreted to determine what task is being requested. A task may be any activity that computers are known to handle or any sort of action that may be computer controlled (or otherwise electronically controlled). Some typical tasks include: to begin monitoring a switch (or router); performing an agent self-update to download and install a new version of the monitoring agent; monitoring some specified hardware or software (e.g., monitoring temperature levels in a building, monitoring bandwidth usage at a wireless node); querying the version of a software module; troubleshooting either the monitoring agent or another agent or specified hardware or software; and other like types of tasks as are known by those of ordinary skill in the art. Once the command has been interpreted and the task is known the method proceeds from block 207 to block 209.

In block 209 it is determined whether or not the monitoring agent (e.g., monitoring agent 105) has the capability to execute the command and perform the requested task. If the agent has the requisite capability the method proceeds along the "YES" path to block 211 where the task is performed. However, if it is determined in block 209 that the agent does not have the capability to perform the task the method proceeds along the "NO" path to block 217 to begin the process of obtaining the capability.

In block 217 a search is made for the capability. The search may be conducted in a library of executables that the agent has access to, from among a list of other agents associated with the monitoring agent, or elsewhere within the host (e.g., host 103) where the monitoring agent resides. In some embodiments the search may be made outside the host—for example, on a network to which the monitoring agent has access, or the Internet. The search itself is a predefine routine specifying the places to be searched, and the order of the search. In some embodiments the search may entail executing the entire predefine routine of all potential places where a capability may possibly be found. In such embodiments it may be the case that multiple capabilities are found during the search. If this is the case the monitoring agent may select the most suitable source of capability from among the possible choices. In other embodiments the search may be specified such that the search ends upon finding a suitable capability. In yet other embodiments the search may continue until a predefined number of suitable capabilities are discovered. For example, upon finding three (or two, or four, five, ten, etc.) suitable capabilities, the search ends and the monitoring agent selects one of the discovered capabilities as described below in conjunction with FIG. 2B.

The method proceeds from conducting the search in block 217 to block 219. In some embodiments the search may be conducted in its entirety (through the entire predefine routine) before the method proceeds from block 217 to block 219. In other embodiments the method proceeds to block 219 once a capability is discovered (or the required number of alternatives are discovered, e.g., two, three, ten, etc.). In yet other embodiments the monitoring agent maintains a timer or counter, and the method proceeds to block 219 once the timer or counter reaches a predefined limit. In block 219 it is determined whether a capability has been found. If it is determined in block 219 that no capability has been found, the method proceeds along the "NO" branch to block 221. In block 221 it is determined whether the timeout (if any) for conducting the search has been completed. If the timeout has been completed and a capability was not found the method proceeds from block 221 to block 223 to report the negative result. The method then proceeds to block 231, and ends. However, if it is determined back in block 221 that the timeout for the search has not yet been reached, the method proceeds along the "NO" path back to block 217 to continue searching for the capability.

Back in block 219 if it is determined that a capability was found, the method proceeds along the "YES" branch to block 225. In block 225 it is determined whether the capability is readily obtainable. A capability is readily obtainable if the monitoring agent can download and install it with no need for permissions, outside approvals, or other actions required from outside the monitoring agent. In some embodiments the search may continue even after an acceptable capability has been found in order to discover whether additional similar capabilities can be discovered. The process for continuing the search for additional capabilities is described below in conjunction with FIG. 2B.

Returning to block 225 if the identified capability is not readily available the method proceeds from block 225 via the "NO" path to block 227 to report the status and/or issue a request for the capability. A status may indicate that the capability is available but requires permission, a password, or other action from outside the monitoring agent. A request may request the needed permission, a password, etc. in order to obtain the capability. A request may also request modification of an existing capability that is available, but is not quite suitable for executing the command and completing the task. A request may also request the purchase of an identified capability which is known to be suitable. Once the status and/or request has been completed in block 227, the method proceeds to block 231 and ends.

Back in block 225, if the identified capability is readily available the method proceeds from block 225 via the "YES" path to block 229. In block 229 the capability is obtained. That is, the capability is downloaded (or otherwise received), and installed. The capability may either be installed in the monitoring agent itself, or installed in a location or set of software that allows the monitoring agent to access and execute the capability, thus performing the task. Once the installation is complete in block 229 the method proceeds to block 211 to perform the task. Upon completion of the task the method proceeds to block 213 to determine whether the task has been completed properly. If the task has not been completed correctly the method proceeds from block 213 back to block 209 to again determine if the capability to perform the task is available, and start the search process again. If it is determined in block 213 that the task has been completed correctly the method proceeds from block 213 to block 215 to report the completion of the task. Once the task report has been completed in block 215 the method proceeds to block 231 and ends.

Figure 2B:
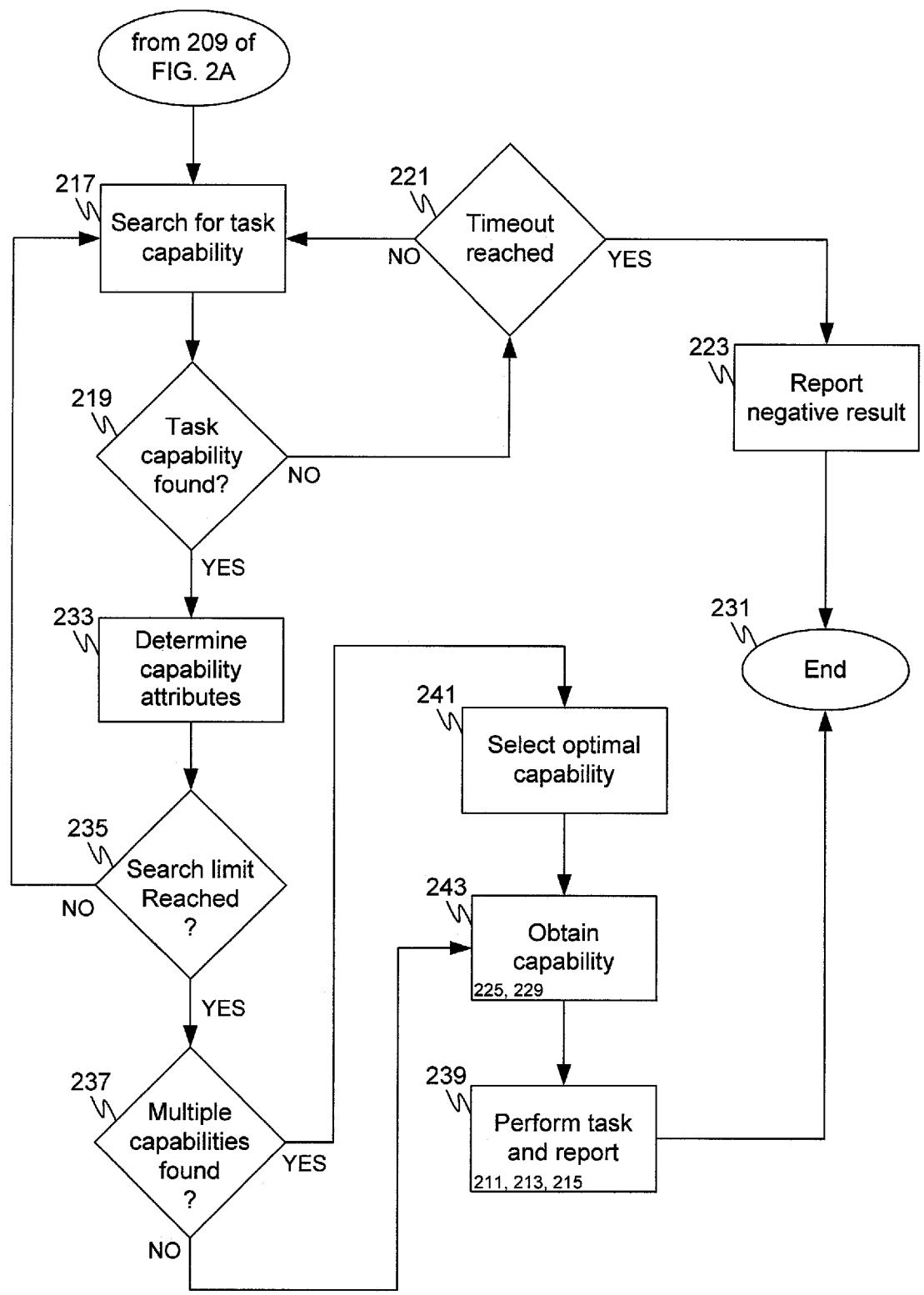
FIG. 2B is a flowchart of activities involved in retrieving multiple similar task capabilities in accordance with various embodiments.

FIG. 2B is a flowchart of activities involved in retrieving multiple similar task capabilities in accordance with various embodiments. Some implementations may include the option to continue searching even after an acceptable capability has been found in order to discover whether additional similar capabilities can be discovered. In such implementations the method proceeds from block 209 of FIG. 2A along the "YES" path to block 217 of FIG. 2B. Blocks 217, 219, 221 and 223 of FIG. 2B are similar to the like numbered blocks FIG. 2A. In block 217 a search is made for the capability in a library of executables that the agent has access to, from among a list of other agents associated with the monitoring agent, or elsewhere within the host (e.g., host 103) where the monitoring agent resides or even outside the host—for example, on a network to which the monitoring agent has access, or the Internet. The search may be a predefine routine specifying the places to be searched, and the order of the search.

The method proceeds from block 217 to block 219 to determine whether a capability has been found. If it is determined in block 219 that no capability has been found, the method proceeds along the "NO" branch to block 221. In block 221 it is determined whether the timeout (if any) for conducting the search has been completed. If the timeout has been completed and a capability was not found the method proceeds from block 221 to block 223 to report the negative result. The method then proceeds to block 231, and ends. However, if it is determined back in block 221 that the timeout for the search has not yet been reached, the method proceeds along the "NO" path back to block 217 to continue searching for the capability.

Back in block 219 if it is determined that a capability was found, the method proceeds along the "YES" branch to block 233. In block 233 the capability attributes are determined. The capability attributes may be used to evaluate and select the optimal capability from among multiple found capabilities. The capability attributes may include attributes specific to the type of capability being sought or attributes standard to all (or most) capabilities, including for example: revision number and date of the capability, compatibility with multiple systems/platforms, cost (e.g., licensing fees per unit), execution speed, required memory, and/or other like types of capability attributes known to those of ordinary skill in the art.

Upon determining the capability attributes in block 233 the method proceeds to block 235 to determine whether or not the search limit has been reached. In various embodiments the search may be limited by the number of capabilities found, by a timer, by the number of locations searched, by the number of instructions performed in the search, by the found capability meeting certain predefined parameters (e.g., an exact match), or by any other constraint known to those of ordinary skill in the art. For example, if the search is limited to finding three capabilities and the capability obtained in block 219 is the second capability then block 235 will determine that the limit has not been reached and loop back via the "NO" path to block 217 to search for more capabilities. However, if the capability is the third found capability then block 235 will determine that the search limit has been reached. Upon reaching the search limit the method proceeds from block 235 along the "YES" path to block 237 to determine whether multiple capabilities have been found. If the search resulted in only a single found capability the method proceeds from block 237 along the "NO" path to block 243. However, if block 237 reveals that multiple capabilities were found then the method proceeds along the "YES" path to block 241.

In block 241 the optimal capability is selected from among the multiple capabilities found. The selection process may be based on the capability attributes determined in block 233. The selection may be made by weighting the capability attributes, calculating a score for each capability, and making the selection based on the highest score. One or more of the capability attributes may be designated as crucial. If a candidate capability lacks a crucial capability attribute it will be eliminated from consideration. Other methods of selecting the optimal capability known to those of ordinary skill in the art may be employed to make the selection in block 241.

Upon selecting the optimal capability in block 241 the method proceeds to block 243. (Block 243 is similar to the elements performed in blocks 225/229 of FIG. 2A.) Once the capability of obtained in block 243 the method proceeds to block 239 to perform the task and report the results. (Block 239 is similar to the elements performed in blocks 211/213/215 of FIG. 2A.) Upon performing the task and reporting the results in block 239 the method proceeds to block 231 and ends.

Figure 3:
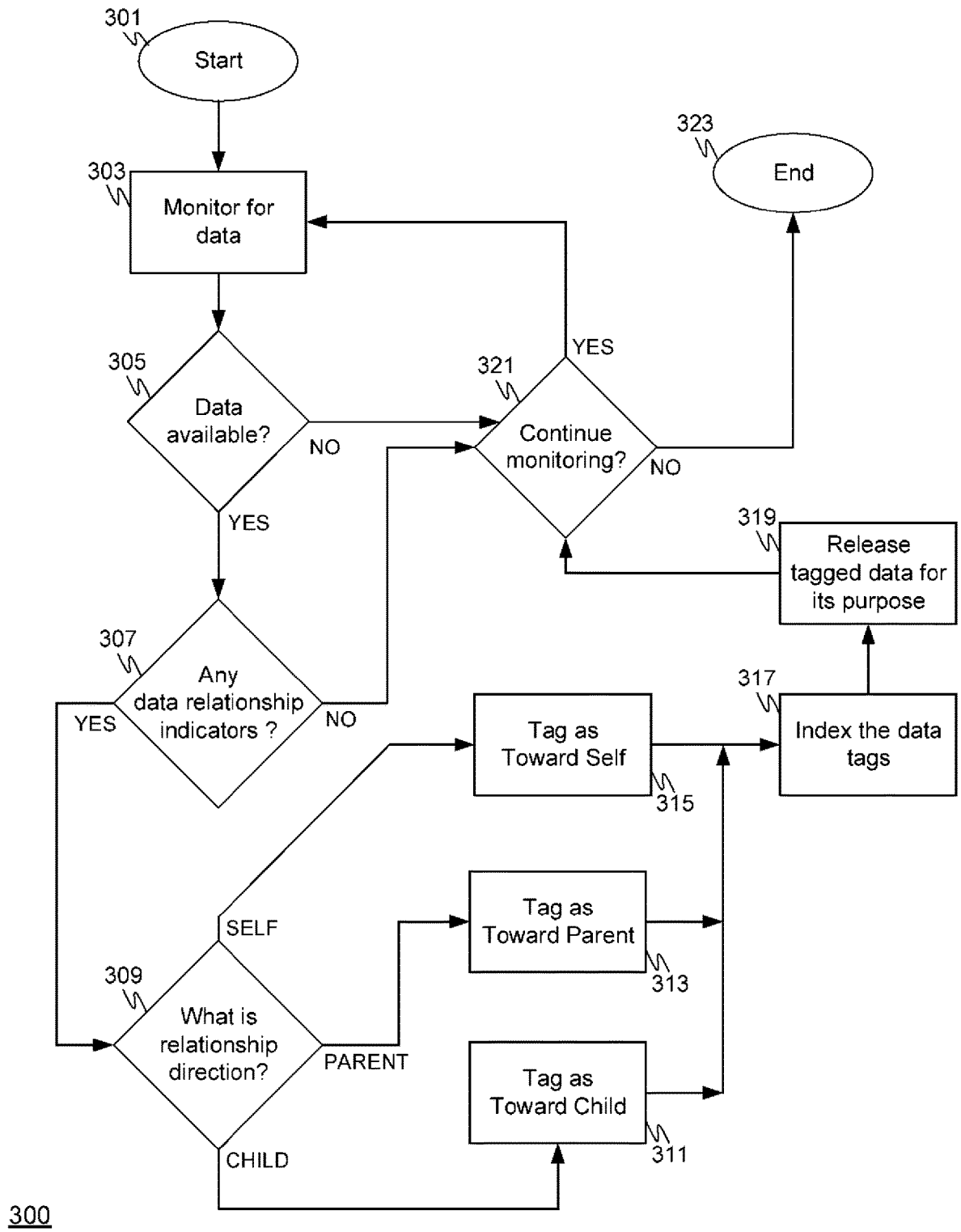
FIG. 3 is a flowchart of activities involved in identifying and tagging information and data within the host, in accordance with various embodiments.

FIG. 3 is a flowchart of activities involved in identifying and tagging information and data within the host, in accordance with various embodiments. The tagging allows capabilities to be more easily discovered. The host (e.g., host 103 of FIG. 1) is the environment in which the monitoring agent resides and operates. The monitoring agent's search for a desired capability within the host depends largely upon the capabilities that are in the host being identified and tagged. This is achieved through a distributed annotation pattern that is implemented across the host. For example, the annotation pattern may be implemented across data providers available with the observIQ™ (formerly Blue Medora™) BindPlane solution. Doing this organizes the relationships between entities monitored through the software. Information that may be used to identify an entity is tagged with a direction (e.g., toward parent, toward child, toward self).

When data from multiple sources passes through BindPlane, these tagged data are cross-referenced, and matches register as directional relationships. For example, a SQL Server database may provide the hostname on which it is running. This datum would be marked as a relationship indicator, pointing to its parent. Likewise, a virtualization technology such as VMware vCenter, would provide a list of hosts, each of which has its hostname marked as a relationship indicator, pointing to itself. BindPlane would detect these two tags, and create a directed relationship where the VMware Virtual Machine is the parent, and the SQL Server database is the child.

Turning to FIG. 3, the method begins at block 301 and proceeds to block 303 to monitor for data, and then on to block 305 to determine whether data or other information is available. If it is determined in block 305 that no data is available the method proceeds along the "NO" path to block 321 for a decision as to whether or not to continue monitoring for data. However, if it is determined in block 305 that there is data available the method proceeds via the "YES" path to block 307. In block 307 the data is evaluated to determine whether there are any relationship indicators to other data, e.g, pointing to parent/child/self.

If no data relationships are discovered in block 307 the method proceeds via the "NO" path to block 321 for a decision as to whether or not to continue monitoring for data. However, if there is an indication in block 307 of a data relationship the method proceeds from block 307 along the "YES" path to block 309. Block 309 interprets the data relationship indicator to arrive at a direction. If block 309 discovers a data relationship indicator pointing toward the data's child the method proceeds along the "CHILD" path to block 311. If block 309 discovers a data relationship indicator pointing toward the data's parent the method proceeds along the "PARENT" path to block 313. If block 309 discovers a data relationship indicator pointing toward the data itself the method proceeds along the "SELF" path to block 315.

Once the data has been tagged as toward child, parent or self in blocks 311-315 the method proceeds to block 317 to index the tags in a database or other searchable, organized listing. Once the tags have been indexed in block 317 the method proceeds to block 319 to release the newly tagged data for its intended purpose. The data tags allow the capabilities of the various executables to be more easily discovered. Upon completing block 319 the method proceeds to block 321 to determine whether or not to continue monitoring for data. To continue monitoring for data the method proceeds from block 321 along the "YES" path back to block 303. If data monitoring is to cease the method proceeds from block 321 along the "NO" path to block 323 where the method ends.

Figure 4:
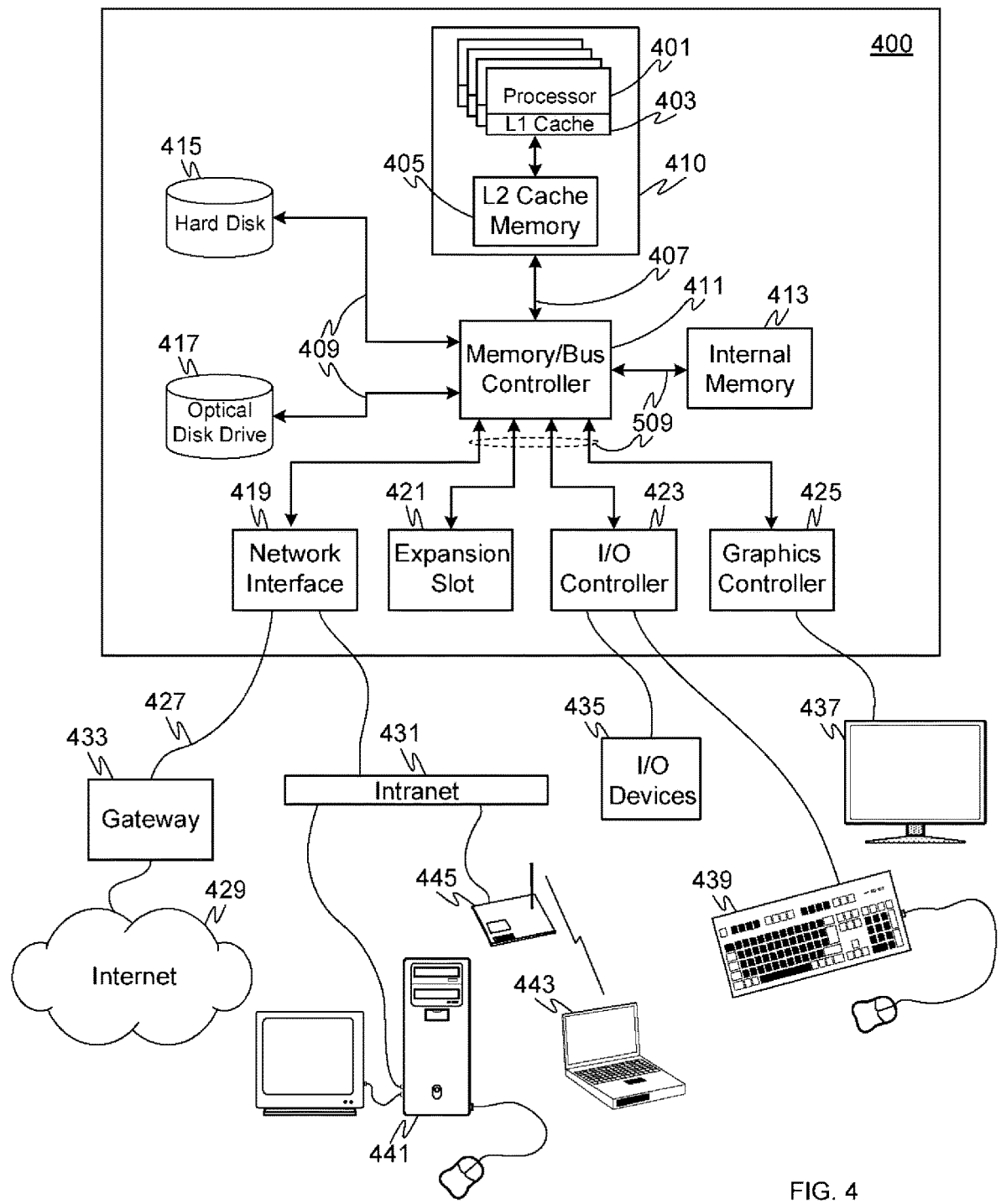
FIG. 4 depicts a computer system and various system components suitable for implementing the various embodiments.

FIG. 4 depicts a computer system 400 and various components suitable for implementing the various embodiments disclosed herein. The computer system 400 may be configured in the form of a desktop computer, a laptop computer, a mainframe computer, or any other hardware or logic arrangement capable of being programmed or configured to carry out instructions. The computer system 400 may be embodied as an admin server that performs various functions, activities and methods described above. In some embodiments the computer system 400 may act as a server, accepting inputs from a remote user over a local area network (LAN) 427, the Internet 429, or an intranet 431. In other embodiments, the computer system 400 may function as a smart user interface device for a server on the LAN 427 or over the Internet 429. The computer system 400 may be located and interconnected in one location, or may be distributed in various locations and interconnected via communication links such as a LAN 427 or a wide area network (WAN), via the Internet 429, via the public switched telephone network (PSTN), a switching network, a cellular telephone network, a wireless link, or other such communication links. Other devices may also be suitable for implementing or practicing the embodiments, or a portion of the embodiments. Such devices include personal digital assistants (PDA), wireless handsets (e.g., a cellular telephone or pager), and other such electronic devices preferably capable of being programmed to carry out instructions or routines. Those of ordinary skill in the art may recognize that many different architectures may be suitable for the computer system 400, although only one typical architecture is depicted in FIG. 4.

Computer system 400 may include a processor 401 which may be embodied as a microprocessor, two or more parallel processors as shown in FIG. 4, a central processing unit (CPU) or other such control logic or circuitry. The processor 401 may be configured to access a local cache memory 403, and send requests for data that are not found in the local cache memory 403 across a cache bus to a second level cache memory 405. Some embodiments may integrate the processor 401, and the local cache 403 onto a single integrated circuit and other embodiments may utilize a single level cache memory or no cache memory at all. Other embodiments may integrate multiple processors 401 onto a single die and/or into a single package. Yet other embodiments may integrate multiple processors 401 with multiple local cache memories 403 with a second level cache memory 405 into a single package 410 with a front side bus 407 to communicate to a memory/bus controller 411. The memory/bus controller 411 may accept accesses from the processor(s) 401 and direct them to either the internal memory 413 or to the various input/output (I/O) busses 409. Some embodiments of the computer system 400 may include multiple processor packages 410 sharing the front-side bus 407 to the memory/bus controller. Other embodiments may have multiple processor packages 410 with independent front-side bus connections to the memory/bus controller. The memory bus controller may communicate with the internal memory 413 using a memory bus 409.

The internal memory 413 may include one or more of random access memory (RAM) devices such as synchronous dynamic random access memories (SDRAM), double data rate (DDR) memories, or other volatile random access memories. The internal memory 413 may also include non-volatile memories such as electrically erasable/programmable read-only memory (EEPROM), NAND flash memory, NOR flash memory, programmable read-only memory (PROM), read-only memory (ROM), battery backed-up RAM, or other non-volatile memories. In some embodiments, the computer system 400 may also include $3^{rd}$ level cache memory or a combination of these or other like types of circuitry configured to store information in a retrievable format. In some implementations the internal memory 413 may be configured as part of the processor 401, or alternatively, may be configured separate from it but within the same package 410. The processor 401 may be able to access internal memory 413 via a different bus or control lines than is used to access the other components of computer system 400.

The computer system 400 may also include, or have access to, one or more hard drives 415 (or other types of storage memory) and optical disk drives 417. Hard drives 415 and the optical disks for optical disk drives 417 are examples of machine readable (also called computer readable) mediums suitable for storing the final or interim results of the various embodiments. The optical disk drives 417 may include a combination of several disc drives of various formats that can read and/or write to removable storage media (e.g., CD-R, CD-RW, DVD, DVD-R, DVD-W, DVD-RW, HD-DVD, Blu-Ray, and the like). Other forms or computer readable media that may be included in some embodiments of computer system 400 include, but are not limited to, floppy disk drives, 9-track tape drives, tape cartridge drives, solid-state drives, cassette tape recorders, paper tape readers, bubble memory devices, magnetic strip readers, punch card readers or any other type or computer useable or machine-readable storage medium.

The computer system 400 may either include the hard drives 415 and optical disk drives 417 as an integral part of the computer system 400 (e.g., within the same cabinet or enclosure and/or using the same power supply), as connected peripherals, or may access the hard drives 415 and optical disk drives 417 over a network, or a combination of these. The hard drive 415 often includes a rotating magnetic medium configured for the storage and retrieval of data, computer programs or other information. In some embodiments, the hard drive 415 may be a solid-state drive using semiconductor memories. In other embodiments, some other type of computer useable medium may be used. The hard drive 415 need not necessarily be contained within the computer system 400. For example, in some embodiments the hard drive 415 may be server storage space within a network that is accessible to the computer system 400 for the storage and retrieval of data, computer programs or other information. In some instances, the computer system 400 may use storage space at a server storage farm, or like type of storage facility, that is accessible by the Internet 429 or other communications lines. The hard drive 415 is often used to store the software, instructions and programs executed by the computer system 400, including for example, all or parts of the computer application program for carrying out activities of the various embodiments.

The communication link 409 may be used to access the contents of the hard drives 415 and optical disk drives 417. The communication links 409 may be point-to-point links such as Serial Advanced Technology Attachment (SATA) or a bus type connection such as Parallel Advanced Technology Attachment (PATA) or Small Computer System Interface (SCSI), a daisy chained topology such as IEEE-1394, a link supporting various topologies such as Fibre Channel, or any other computer communication protocol, standard or proprietary, that may be used for communication to computer readable medium. The memory/bus controller may also provide other I/O communication links 409. In some embodiments, the links 409 may be a shared bus architecture such as peripheral component interface (PCI), microchannel, industry standard architecture (ISA) bus, extended industry standard architecture (EISA) bus, VERSAmoduleEurocard (VME) bus, or any other shared computer bus. In other embodiments, the links 409 may be a point-to-point link such as PCI-Express, HyperTransport, or any other point-to-point I/O link. Various I/O devices may be configured as a part of the computer system 400.

In many embodiments, a network interface 419 may be included to allow the computer system 400 to connect to a network 427 or 431. Either of the networks 427 and 431 may operate in accordance with standards for an IEEE 802.3 ethernet network, an IEEE 802.11 Wi-Fi wireless network, or any other type of computer network including, but not limited to, LANs, WAN, personal area networks (PAN), wired networks, radio frequency networks, powerline networks, and optical networks. A network gateway 433 or router, which may be a separate component from the computer system 400 or may be included as an integral part of the computer system 400, may be connected to the networks 427 and/or 431 to allow the computer system 400 to communicate with the Internet 429 over an internet connection such as an asymmetric digital subscriber line (ADSL), data over cable service interface specification (DOCSIS) link, T1 or other internet connection mechanism. In other embodiments, the computer system 400 may have a direct connection to the Internet 429. The computer system 400 may be connected to one or more other computers such as desktop computer 441 or laptop computer 443 via the Internet 429, an intranet 431, and/or a wireless node 445. In some embodiments, an expansion slot 421 may be included to allow a user to add additional functionality to the computer system 400.

The computer system 400 may include an I/O controller 423 providing access to external communication interfaces such as universal serial bus (USB) connections, serial ports such as RS-232, parallel ports, audio in and audio out connections, the high performance serial bus IEEE-1394 and/or other communication links. These connections may also have separate circuitry in some embodiments, or may be connected through a bridge to another computer communication link provided by the I/O controller 423. A graphics controller 425 may also be provided to allow applications running on the processor 401 to display information to a user. The graphics controller 425 may output video through a video port that may utilize a standard or proprietary format such as an analog video graphic array (VGA) connection, a digital video interface (DVI), a digital high definition multimedia interface (HDMI) connection, or any other video connection. The video connection may connect to display 437 to present the video information to the user.

The display 437 may be any of several types of displays or computer monitors, including a liquid crystal display (LCD), a cathode ray tube (CRT) monitor, on organic light emitting diode (OLED) array, or other type of display suitable for displaying information for the user. The display 437 may include one or more light emitting diode (LED) indicator lights, or other such display devices. Typically, the computer system 400 includes one or more user input/output (I/O) devices such as a keyboard and mouse 439, and/or other means of controlling the cursor represented including but not limited to a touchscreen, touchpad, joystick, trackball, tablet, or other device. The user I/O devices 435 may connect to the computer system 400 using USB interfaces or other connections such as RS-232, PS/2 connector or other interfaces. Various embodiments include input devices configured to accept an input from a user and/or provide an output to a user. For example, some embodiments may include a webcam (e.g., connect via USB), a microphone (e.g., connected to an audio input connection), and/or speakers (e.g., connected to an audio output connection). The computer system 400 typically has a keyboard and mouse 439, a monitor 437, and may be configured to include speakers, microphone, and a webcam. These input/output devices may be used in various combinations, or separately, as means for presenting information to the user and/or receiving information and other inputs from a user to be used in carrying out various programs and calculations. Speech recognition software may be used in conjunction with the microphone to receive and interpret user speech commands.

The computer system 400 may be suitable for use in identifying critical web services and dynamically relocating them to a new server. For example, the processor 401 may be embodied as a microprocessor, microcontroller, DSP, RISC processor, two or more parallel processors, or any other type of processing unit that one of ordinary skill would recognize as being capable of performing or controlling the functions, steps, activities and methods described herein. A processing unit in accordance with at least one of the various embodiments can operate computer software programs stored (embodied) on computer-readable medium such those compatible with the disk drives 415, the optical disk drive 417 or any other type of hard disk drive, floppy disk, flash memory, ram, or other computer readable medium as recognized by those of ordinary skill in the art.

As will be appreciated by those of ordinary skill in the art, aspects of the various embodiments may be embodied as a system, method or computer program product. Accordingly, aspects of the present invention may take the form of an entirely hardware embodiment, an entirely software embodiment (including firmware, resident software, micro-code, or the like) or an embodiment combining software and hardware aspects that may all generally be referred to herein as a "circuit," "module," "logic" or "system." Furthermore, aspects of the various embodiments may take the form of a computer program product embodied in one or more computer readable medium(s) having computer readable program code stored thereon.

Any combination of one or more non-transitory computer readable medium(s) may be utilized. The computer readable medium is typically a computer readable storage medium. A computer readable storage medium may be embodied as, for example, an electronic, magnetic, optical, electromagnetic, infrared, or semiconductor system, apparatus, or device, or other like storage devices known to those of ordinary skill in the art, or any suitable combination of the foregoing. Examples of such computer readable storage medium include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code for carrying out operations and aspects of the various embodiments may be written in any combination of one or more programming languages, including an object oriented programming language such as Java, Smalltalk, C++, or the like, and conventional procedural programming languages, such as the "C" programming language or similar programming languages. In accordance with various implementations, the program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus, systems, and computer program products according to various embodiments disclosed herein. It will be understood that blocks of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, a programmable data processing apparatus, or other such devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks. The flowchart and/or block diagrams in the figures help to illustrate the architecture, functionality, and operation of possible implementations of systems, methods and computer program products according to various embodiments. In this regard, each block in the flowchart or block diagrams may represent a module, segment, or portion of a program of instructions, code or other logic, which comprises one or more executable instructions for implementing the specified logical function(s).

It should also be noted that, in some alternative implementations, the functions noted in the block may occur in an order other that that depicted in the figures. For example, two blocks shown in succession may, in fact, be executed substantially concurrently, or the blocks and activities of the figures may sometimes be executed in reverse order or in a different order, depending upon the functionality involved. For example, the monitoring block 203 of FIG. 2A may go on continuously to detect other commands while the rest of the steps of the method are performed to search for a capability of a previously received command. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises," "comprising," "includes," and/or "including" used in this specification specify the presence of stated features, integers, steps, operations, elements, and/or components, but do not preclude the presence or addition of one or more other features, integers, steps, operations, elements, components, and/or groups thereof. The term "obtaining", as used herein and in the claims, may mean either retrieving from a computer readable storage medium, receiving from another computer program, receiving from a user, calculating based on other input, or any other means of obtaining a datum or set of data. The term "plurality", as used herein and in the claims, means two or more of a named element. It should not, however, be interpreted to necessarily refer to every instance of the named element in the entire device. Particularly, if there is a reference to "each" element of a "plurality" of elements. There may be additional elements in the entire device that are not be included in the "plurality" and are not, therefore, referred to by "each."

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and gist of the invention. The various embodiments included herein were chosen and described in order to best explain the principles of the invention and the practical application, and to enable others of ordinary skill in the art to understand the invention for various embodiments with various modifications as are suited to the particular use contemplated.

The invention claimed is:

1. A method of gaining an ability to perform a task in a monitoring agent operating in a host, comprising:
    receiving, at the monitoring agent, a command instructing the monitoring agent to perform the task;
    determining that the monitoring agent lacks ability to execute the command and perform said task;
    imposing a search limit;
    searching for capabilities sufficient to perform the task;
    discovering a plurality of the capabilities sufficient to perform the task including a first capability and a second capability;
    evaluating the plurality of capabilities to determine an optimal capability from among the plurality of capabilities to perform the task; and
    selecting the first capability as the optimal capability from among the plurality of capabilities for performing the task;
    obtaining the first capability for the monitoring agent; and
    executing the command by the monitoring agent to perform said task using the first capability;
    wherein the selection of the first capability as the optimal capability is based on a plurality of capability attributes of the first capability; and
    wherein the plurality of capability attributes includes cost of the first capability, age of the first capability based on a revision number and revision date of the first capability, and memory requirements for the first capability.

2. The method of claim 1, wherein said obtaining the first capability further comprises:
    downloading the first capability; and
    installing the first capability.

3. The method of claim 1, further comprising:
    monitoring, by the monitoring agent, for received communications;
    wherein the received communications comprise received commands including said command instructing the monitoring agent to perform the task.

4. The method of claim 1, further comprising:
    interpreting the command to determine said task.

5. The method of claim 1, wherein said searching for the capabilities to perform the command further comprises:
    searching within the host for the capabilities to perform the command.

6. The method of claim 1, wherein the first capability and the second capability are a predefined functionality of a service running on a computer; and
    wherein the service is a component in an application programming interface.

7. The method of claim 1, wherein said searching for the capabilities to perform the command further comprises:
    terminating the searching in response to the plurality of the capabilities discovered equaling the search limit.

8. The method of claim 1, wherein said searching for the capabilities to perform the command further comprises:
    searching outside the host for the capabilities to perform the command.

9. A software product comprising a non-transitory machine-readable medium including a program of instructions for gaining an ability to perform a task in a monitoring agent operating in a host, wherein the program of instructions upon being executed on a computer causes the computer to perform activities comprising:
    receiving, at the monitoring agent, a command instructing the monitoring agent to perform the task;
    determining that the monitoring agent lacks ability to execute the command and perform said task;
    imposing a search limit;
    searching for capabilities sufficient to perform the task;
    discovering a plurality of capabilities sufficient to perform the task including a first capability and a second capability;
    evaluating the plurality of capabilities to determine an optimal capability from among the plurality of capabilities to perform the task; and
    selecting the first capability as the optimal capability from among the plurality of capabilities for performing the task;
    obtaining the first capability for the monitoring agent; and
    executing the command by the monitoring agent to perform said task using the first capability;
    wherein the selection of the first capability as the optimal capability is based on a plurality of capability attributes of the first capability; and
    wherein the plurality of capability attributes includes cost of the first capability, age of the first capability based on a revision number and revision date of the first capability, and memory requirements for the first capability.

10. The software product of claim 9, wherein said obtaining the first capability further comprises:
    downloading the first capability; and
    installing the first capability.

11. The software product of claim 9, further comprising:
    monitoring, by the monitoring agent, for received communications;
    wherein the received communications comprise received commands including said command instructing the monitoring agent to perform the task.

12. The software product of claim 9, further comprising:
    interpreting the command to determine said task.

13. The software product of claim 9, wherein said searching for the capabilities to perform the command further comprises:
    searching within the host for the capabilities to perform the command.

14. The software product of claim 9, wherein the first capability and the second capability are a predefined functionality of a service running on a computer; and
    wherein the service is a component in an application programming interface.

15. The software product of claim 9, wherein said searching for the capabilities to perform the command further comprises:
    terminating the searching in response to the plurality of the capabilities discovered equaling the search limit.

16. The software product of claim 9, wherein said searching for the capabilities to perform the command further comprises:
    searching outside the host for the capabilities to perform the command.

* * * * *